US012288514B2

(12) United States Patent
Bao et al.

(10) Patent No.: US 12,288,514 B2
(45) Date of Patent: Apr. 29, 2025

(54) DISPLAY METHOD, DISPLAY DEVICE, AND COMPUTER READABLE MEDIUM

(71) Applicants: Hefei BOE Joint Technology Co., Ltd., Anhui (CN); BOE TECHNOLOGY GROUP CO., LTD., Beijing (CN)

(72) Inventors: Wenchao Bao, Beijing (CN); Zhidong Yuan, Beijing (CN); Xiaolong Wei, Beijing (CN); Min He, Beijing (CN); Huihui Li, Beijing (CN)

(73) Assignees: Hefei BOE Joint Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/577,122

(22) PCT Filed: Aug. 18, 2022

(86) PCT No.: PCT/CN2022/113381

§ 371 (c)(1),
(2) Date: Jan. 5, 2024

(87) PCT Pub. No.: WO2024/036572

PCT Pub. Date: Feb. 22, 2024

(65) Prior Publication Data

US 2025/0095563 A1 Mar. 20, 2025

(51) Int. Cl.
*G09G 3/30* (2006.01)
*G09G 3/20* (2006.01)
(Continued)

(52) U.S. Cl.
CPC ......... *G09G 3/3208* (2013.01); *G09G 3/2096* (2013.01); *G09G 2310/04* (2013.01);
(Continued)

(58) Field of Classification Search
CPC ............... G09G 3/3208; G09G 3/2906; G09G 2310/04; G09G 2320/0261; G09G 2340/0435
See application file for complete search history.

(56) References Cited

U.S. PATENT DOCUMENTS

2007/0071398 A1* 3/2007 Raveendran ......... H04N 19/114 386/326
2008/0247469 A1* 10/2008 Vadapalli .............. H04N 19/89 375/E7.17
(Continued)

FOREIGN PATENT DOCUMENTS

CN 103325332 A 9/2013
CN 105528217 A 4/2016
(Continued)

*Primary Examiner* — Sanghyuk Park
(74) *Attorney, Agent, or Firm* — HOUTTEMAN LAW LLC

(57) ABSTRACT

A display method, including: performing a full-screen display refresh on a display panel at a first refresh rate; meanwhile, setting a refresh factor to n, where n is a positive integer; refreshing the local area of the display panel at the second refresh rate; increasing the refresh factor by m, where m is a positive integer; determining whether the refresh factor is greater than or equal to a set value; if yes, performing the full-screen display refresh on the display panel at the first refresh rate; setting the refresh factor to n; and if no, continuing refreshing the same local area of the display panel at the second refresh rate; increasing the refresh factor by m, where the second refresh rate is greater than the first refresh rate, and the second refresh rate is an integer multiple of the first refresh rate.

16 Claims, 4 Drawing Sheets

(51) Int. Cl.
*G09G 3/3208* (2016.01)
*G09G 3/36* (2006.01)

(52) U.S. Cl.
CPC ............... *G09G 2320/0261* (2013.01); *G09G 2340/0435* (2013.01)

(56) References Cited

U.S. PATENT DOCUMENTS

| | | | | |
|---|---|---|---|---|
| 2010/0231800 | A1* | 9/2010 | White .................. | G09G 3/2022 348/E5.065 |
| 2015/0146780 | A1* | 5/2015 | Miyoshi ............... | H04N 19/167 375/240.12 |
| 2017/0148422 | A1 | 5/2017 | Huang et al. | |

FOREIGN PATENT DOCUMENTS

| | | | |
|---|---|---|---|
| CN | 112562570 | A | 3/2021 |
| CN | 114170940 | A | 3/2022 |
| CN | 114489892 | A | 5/2022 |
| CN | 114664264 | A | 6/2022 |

* cited by examiner

DISPLAY METHOD, DISPLAY DEVICE, AND COMPUTER READABLE MEDIUM

TECHNICAL FIELD

The present disclosure relates to the field of display technologies, and in particular to a display method, a display device, and a computer readable medium.

BACKGROUND

Due to limitations of peripheral hardware, an OLED (Organic Light-Emitting Diode) panel cannot support a full-screen high refresh rate when displaying. With the same peripheral hardware, which can support the OLED panel to display at a full-screen refresh rate of 120 Hz, the display resolution must be reduced to achieve a higher refresh rate.

SUMMARY

In a first aspect, an embodiment of the present disclosure provides a display method, including:

performing a full-screen display refresh on a display panel at a first refresh rate; meanwhile, setting a refresh factor to n, where n is a positive integer;

determining whether there is a local area of the display panel to be refreshed at a second refresh rate;

if there is no local area of the display panel to be refreshed at the second refresh rate, continuing performing the full-screen display refresh on the display panel at the first refresh rate;

if there is a local area of the display panel to be refreshed at the second refresh rate, refreshing the local area of the display panel at the second refresh rate; meanwhile, increasing the refresh factor by m, where m is a positive integer;

determining whether the local area refreshed at the second refresh rate needs to move;

if the local area refreshed at the second refresh rate does not need to move, determining whether the refresh factor is greater than or equal to a set value;

if the refresh factor is greater than or equal to the set value, performing the full-screen display refresh on the display panel at the first refresh rate; meanwhile, setting the refresh factor to n; and if the refresh factor is less than the set value, continuing refreshing the same local area of the display panel at the second refresh rate; meanwhile, increasing the refresh factor by m, wherein the second refresh rate is greater than the first refresh rate, and the second refresh rate is an integer multiple of the first refresh rate.

In some embodiments, subsequent to determining whether the local area refreshed at the second refresh rate needs to move, If the local area refreshed at the second refresh rate needs to move, performing the full-screen display refresh on the display panel at the first refresh rate for one frame; meanwhile, setting the refresh factor to n.

In some embodiments, subsequent to determining whether the local area refreshed at the second refresh rate needs to move, if the local area refreshed at the second refresh rate needs to move, refreshing, at the second refresh rate, the local area currently refreshed at the second refresh rate for one frame; meanwhile, increasing the refresh factor by m;

then determining whether the refresh factor is greater than or equal to the set value;

if the refresh factor is greater than or equal to the set value, refreshing the display panel at the first refresh rate for one frame; meanwhile, setting the refresh factor to n;

if the refresh factor is less than the set value, refreshing another local area of the display panel at the second refresh rate; meanwhile, increasing the refresh factor by m.

In some embodiments, when the local area currently refreshed at the second refresh rate is refreshed at the second refresh rate for one frame, images in other areas of the display panel are retained; and when the another local area of the display panel is refreshed at the second refresh rate, images in other areas of the display panel are retained.

In some embodiments, when the local area of the display panel is refreshed at the second refresh rate, images in other areas of the display panel are retained; and when the refresh factor is less than the set value, the same local area of the display panel continues being refreshed at the second refresh rate, and images in other areas of the display panel are retained.

In some embodiments, the refresh factor is times number of refresh at the second refresh rate/times number of refresh with the first refresh rate in a same time period; and the refresh factor is in a range of 2 to 6; and the refresh factor is an integer.

In some embodiments, the set value is in a range of 3 to 6, and the set value is an integer.

In some embodiments, the set value is 3.

In some embodiments, the second refresh rate is 2 to 6 times the first refresh rate.

In some embodiments, the first refresh rate is 120 Hz, and the second refresh rate is 240 Hz;

or, the first refresh rate is 120 Hz, and the second refresh rate is 360 Hz.

In a second aspect, an embodiment of the present disclosure further provides a display device, including a display data providing module, a timing control module, a processing module, and a display panel;

wherein the processing module is connected to the display data providing module; the display data providing module is connected to the timing control module; and the timing control module is connected to the display panel;

the processing module is configured to determine whether there is a local area of the display panel to be refreshed at a second refresh rate, and control the display data providing module to provide display data to the timing control module according to a determination result; the processing module is further configured to determine whether the local area refreshed at the second refresh rate needs to move and whether a refresh factor is greater than or equal to a set value, and control the display data providing module to provide display data to the timing control module according to a determination result; and the processing module is further configured to preset and update the refresh factor;

the display data providing module is configured to provide display data with the first refresh rate to the timing control module, when there is no local area of the display panel to be refreshed at the second refresh rate; the display data providing module is further configured to provide, when there is a local area of the display panel to be refreshed at the second refresh rate, display data with the second refresh rate to the timing control module, to drive the local area of the display panel to display; the display data providing module is further configured to provide a frame of display data with the first refresh rate to the timing control module, when the local area refreshed at the second refresh rate does not need to move and the refresh factor is greater than or equal to the set value; and the display data providing module is further configured to provide, when the local area refreshed at the second refresh rate does not need to move and the refresh factor is less than the set value, display data with the second refresh rate to the timing control module, to drive the same local area in the display panel to display;

the timing control module is configured to control the display panel to display, according to the display data provided by the display data providing module; and the second refresh rate is greater than the first refresh rate, and the second refresh rate is an integer multiple of the first refresh rate.

In some embodiments, the display data providing module is further configured to provide a frame of display data with the first refresh rate to the timing control module, when the local area refreshed at the second refresh rate needs to move.

In some embodiments, the display data providing module is further configured to provide a frame of display data with the second refresh rate to the timing control module, to drive a current local area of the display panel to display, when the local area refreshed at the second refresh rate needs to move;

the display data providing module is further configured to provide a frame of display data with the first refresh rate to the timing control module, when the local area refreshed at the second refresh rate needs to move and the refresh factor is greater than or equal to the set value; and the display data providing module is further configured to provide the display data with the second refresh rate to the timing control module, to drive another local area of the display panel to display, when the local area refreshed at the second refresh rate needs to move and the refresh factor is less than the set value.

In some embodiments, the processing module adopts a central processing unit; the timing control module adopts a timing controller; and the display panel includes a pixel array configured for displaying the display data.

In a third aspect, the disclosed embodiments provide a computer readable medium storing a computer program which, when executed by a processor, cause the processor to perform the above-mentioned display method.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. The above and other features and advantages will become more apparent to one of ordinary skill in the art by describing detailed examples with reference to the accompanying drawings, in which.

DETAIL DESCRIPTION OF EMBODIMENTS

Figure 1:
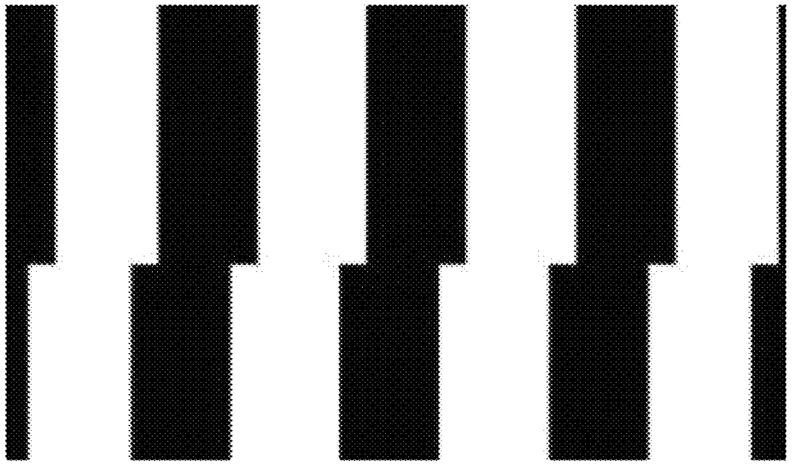
FIG. 1 is a schematic diagram illustrating a tearing phenomenon occurring in an image.

In order to enable one of ordinary skill in the art to better understand the technical solutions of the embodiments of the present disclosure, a display method, a display device, and a computer readable medium provided in the embodiments of the present disclosure are described in detail below with reference to the accompanying drawings.

The embodiments of the present disclosure will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure are not limited to the embodiments shown in the drawings, but include modifications of configurations formed based on a manufacturing process. Thus, the regions illustrated in the figures have illustrative properties, and the shapes of the regions shown in the figures illustrate specific shapes of regions of elements, but are not intended to be limiting.

In the following, the terms "first", "second" are used for descriptive purposes only and are not to be understood as indicating or implying relative importance or implicitly indicating the number of technical features indicated. Thus, a feature defined by "first" or "second" may include explicitly or implicitly one or more such features. In the description of the embodiments of the present disclosure, "a plurality of" means two or more unless otherwise specified.

In the related art, a refresh rate that an OLED panel can support is limited, due to limitations of peripheral hardware. For example, at a specific refresh rate, a maximum row refresh that can be supported by a source driver is fixed; and at a specific refresh rate, a maximum column refresh that can be supported by a bandwidth of a video interface is fixed. That is, when the source driver and the bandwidth of the video interface are determined, a maximum full-screen refresh rate that the OLED panel can support is determined. In order to support higher refresh rates under the same hardware conditions, the display resolution must be reduced.

When the OLED panel is refreshed at a higher frequency, due to limitations of a bandwidth of an overall video interface, an area that can be displayed will be reduced. In this case, a whole display area of the OLED panel is divided into a high frequency refresh area and a low frequency refresh area, and an image displayed in the low frequency refresh area is retained when the high frequency refresh area is refreshed.

On one hand, when the high frequency refresh area of the OLED panel is refreshed in a high frequency, the image in the low frequency refresh area is retained. That is, display data of pixels in the low frequency refresh area are not updated when the high frequency refresh area is refreshed in a high frequency. The display data of the pixels in the low frequency refresh area are maintained by a holding capacitor, and the display data cannot be maintained for a long time due to an electric leakage phenomenon existing in the holding capacitor. That is, the image displayed in the low frequency refresh area cannot be maintained well for a long time, resulting in that a black image appears in the low frequency refresh area when the high frequency refresh area is refreshed in a high frequency.

On the other hand, when the high frequency refresh area of the OLED panel moves (that is, the local area of the OLED panel, which is currently refreshed at a higher refresh rate, is not required to be freshed at the higher refresh rate later, and another different local area of the OLED panel is then required to be refreshed at the higher refresh rate), a previous frame of image refreshed at the high frequency will enter the low frequency refresh area, and the image will be retained. If this is not processed, severe image trail will be caused, resulting in an image tearing phenomenon, referring to FIG. 1, which is a schematic diagram illustrating a tearing phenomenon occurring in an image.

Figure 2:
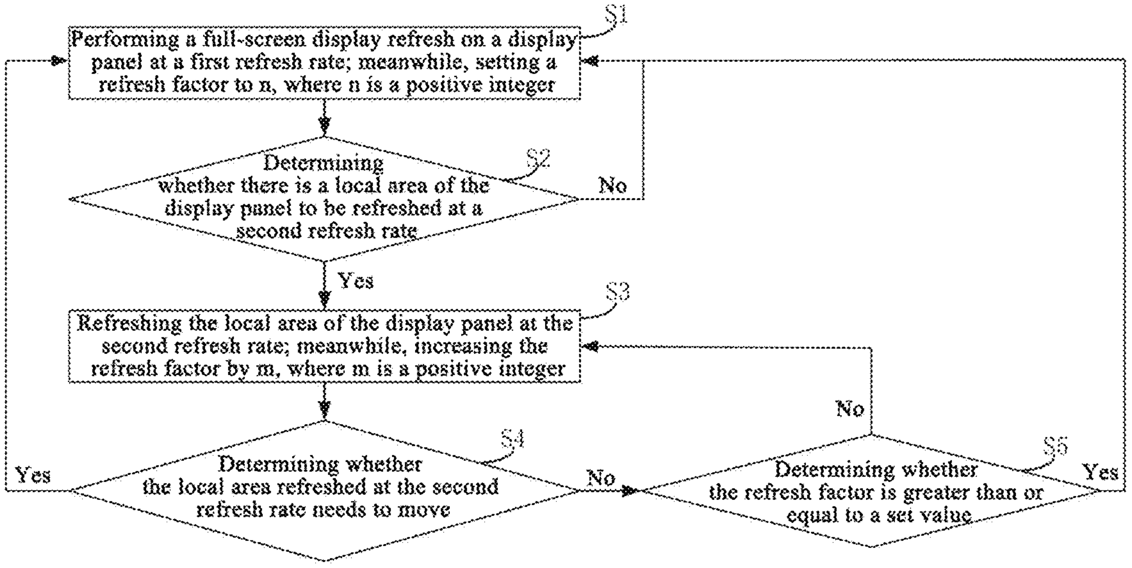
FIG. 2 is a flowchart illustrating a display method provided by an embodiment of the present disclosure.

In order to solve the above problem, in a first aspect, an embodiment of the present disclosure provides a display method, and referring to FIG. 2, which is a flowchart illustrating a display method provided by an embodiment of the present disclosure, the display method includes steps S1 to S5.

Step S1: performing a full-screen display refresh on a display panel at a first refresh rate; meanwhile, setting a refresh factor to n, where n is a positive integer. For example, n is 1.

Step S2: determining whether there is a local area of the display panel to be refreshed at a second refresh rate.

If there is no local area of the display panel to be refreshed at the second refresh rate, continue to step S1: performing the full-screen display refresh on the display panel at the first refresh rate.

If there is a local area of the display panel to be refreshed at the second refresh rate, go to step S3: refreshing the local area of the display panel at the second refresh rate; meanwhile, increasing the refresh factor by m, where m is a positive integer. For example, m is 1.

In some embodiments, when the local area of the display panel is refreshed at the second refresh rate in step S3, images in other areas of the display panel are maintained.

With this determination result of step S2 and the method of executing step S3 according to this determination result, high frequency local refresh can be realized in the display panel, thereby solving the problem that the resolution of full-screen display must be reduced when performing the high frequency refresh, realizing clearer and finer image display in the local area of the display panel, and improving display effect of the full-screen image of the display panel.

Then, execute step S4: determining whether the local area refreshed at the second refresh rate needs to move.

If the local area refreshed at the second refresh rate needs not to move, go to step S5: determining whether the refresh factor is greater than or equal to a set value.

If the refresh factor is greater than or equal to the set value, go to step S1: performing the full-screen display refresh on the display panel at the first refresh rate, that is, refreshing the display panel at the first refresh rate; meanwhile, setting the refresh factor to n.

With this determination result of step S5 and the method of executing step S1 according to this determination result, it can solve the problem that when the local area of the display panel is refreshed at the second refresh rate, the holding capacitor in other areas (i.e. areas refreshed at the first refresh rate) of the display panel cannot maintain the display data for a long time, which causes the black image in the area refreshed at the first refresh rate, so that the display data can be maintained well in the area refreshed at the first refresh rate, thereby ensuring normal display of a full-screen image of the display panel when the local area of the display panel is refreshed at the second refresh rate.

If the refresh factor is less than the set value, continue to step S3: refreshing the local area of the display panel at the second refresh rate, that is, refreshing the same local area of the display panel at the second refresh rate; meanwhile, increasing the refresh factor by m.

In some embodiments, when the refresh factor is less than the set value and the same local area of the display panel continues being refreshed at the second refresh rate in step S3, images in other areas of the display panel are retained. When the refresh factor is less than the set value, and the same local area of the display panel is refreshed at the second refresh rate, the holding capacitor in other areas of the display panel can well maintain the display data, and normal display of the full-screen image of the display panel is ensured when the local area of the display panel is refreshed at the second refresh rate.

The second refresh rate is greater than the first refresh rate, and the second refresh rate is an integer multiple of the first refresh rate.

In some embodiments, the second refresh rate is 2 to 6 times the first refresh rate.

In some embodiments, the first refresh rate is 120 Hz; and the second refresh rate is 240 Hz. In some embodiments, the first refresh rate is 120 Hz; and the second refresh rate is 360 Hz.

In some embodiments, the refresh factor is times number of refresh at the second refresh rate/times number of refresh with the first refresh rate in a same time period; the refresh factor is in a range of 2 to 6; and the refresh factor is an integer.

In some embodiments, the set value is in a range of 3 to 6, and the set value is an integer.

Figure 3:
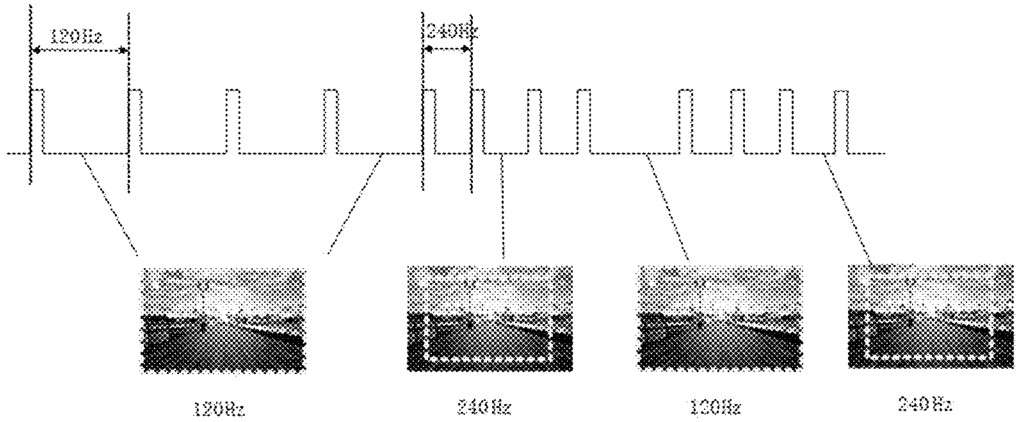
FIG. 3 is a schematic diagram illustrating a refresh timing of a display panel and a corresponding image displayed thereon, in a case where a local area refreshed at a second refresh rate does not move and a refresh factor is equal to 3.

In some embodiments, the set value is 3. FIG. 3 is a schematic diagram illustrating a refresh timing of a display panel and a corresponding image displayed thereon, in a case where the local area refreshed at the second refresh rate does not move and the refresh factor is equal to 3. Referring to FIG. 3, when the local area refreshed at the second refresh rate does not move, a frame of full-screen refresh at the first refresh rate is inserted every after the local area of the display panel is refreshed for three times at the second refresh rate. For example, when the local area refreshed at 240 Hz does not move, every the local area of the display panel is refreshed for three frames at 240 Hz, then a frame of full-screen refresh at 120 Hz is inserted.

In some embodiments, referring to FIG. 2, see step S4: determining whether the local area refreshed at the second refresh rate needs to move. If the local area refreshed at the second refresh rate needs to move, go to step S1: performing the full-screen display refresh on the display panel at the first refresh rate, that is, refreshing one frame of the display panel at the first refresh rate; meanwhile, setting the refresh factor to n.

Figure 4:
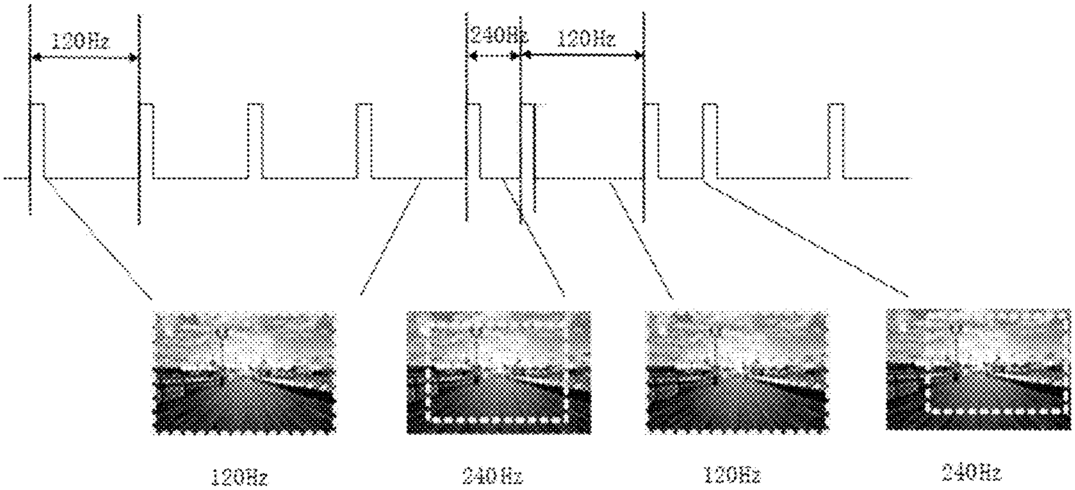
FIG. 4 is a schematic diagram illustrating a refresh timing of a display panel and a corresponding image displayed thereon, in a case where a local area refreshed at a second refresh rate moves.

With this determination result of step S4 and the method of performing step S1 according to this determination result, it can solve the problem of image tearing due to the image trail caused by the fact that the image refreshed at the second refresh rate in a previous frame enters into other areas (i.e. the areas refreshed at the first refresh rate) of the display panel and is retained when the local area refreshed at the second refresh rate moves, and ensure the normal display of the full-screen image of the display panel when the local area refreshed at the second refresh rate moves. FIG. 4 is a schematic diagram illustrating a refresh timing of a display panel and a corresponding image displayed thereon, in a case where a local area refreshed at a second refresh rate moves. Referring to FIG. 4, when a local area refreshed at 240 Hz moves, a frame of full-screen refresh at 120 Hz is then inserted to update a previous frame of an image of the local area refreshed at 240 Hz, and a new local area is then refreshed at 240 Hz.

Figure 5:
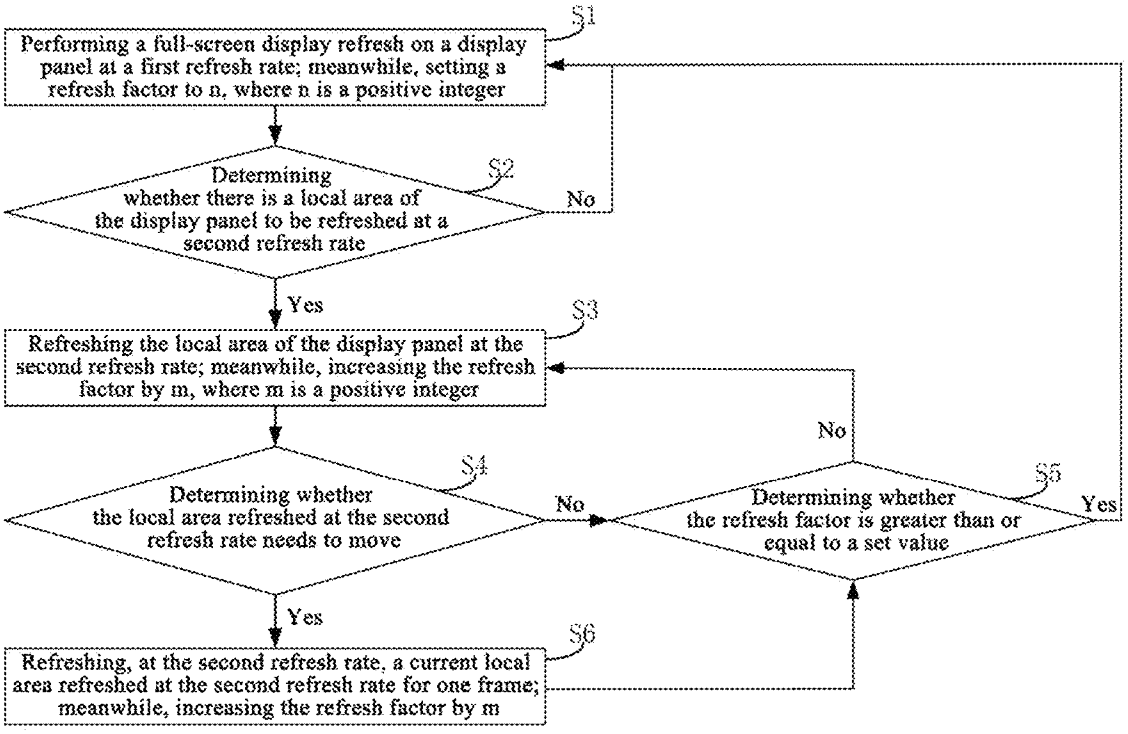
FIG. 5 is a flowchart illustrating another display method provided by an embodiment of the present disclosure.

In some embodiments, referring to FIG. 5, which is a flowchart illustrating another display method provided by an embodiment of the present disclosure, see step S4: determining whether the local area refreshed at the second refresh rate needs to move. If the local area refreshed at the second refresh rate needs to move, go to step S6: refreshing, at the second refresh rate, a frame of a current local area refreshed at the second refresh rate; meanwhile, increasing the refresh factor by m. Then, execute step S5: determining whether the refresh factor is greater than or equal to a set value. If the refresh factor is greater than or equal to the set value, execute step S1: performing the full-screen display refresh on the display panel at the first refresh rate, that is, refreshing one frame of the display panel at the first refresh rate; meanwhile, setting the refresh factor to n. If the refresh factor is less than the set value, execute step S3: refreshing a local area of the display panel at the second refresh rate, that is, refreshing another local area of the display panel at the second refresh rate; meanwhile, increasing the refresh factor by m. Another local area of the display panel refers to a new local area after the local area refreshed at the second refresh rate moves.

In some embodiments, when the current local area refreshed at the second refresh rate is refreshed for one frame at the second refresh rate in step S6, images in other areas of the display panel are retained; when another local area of the display panel is refreshed at the second refresh rate in step S3, the images in other areas of the display panel are retained.

Figure 6:
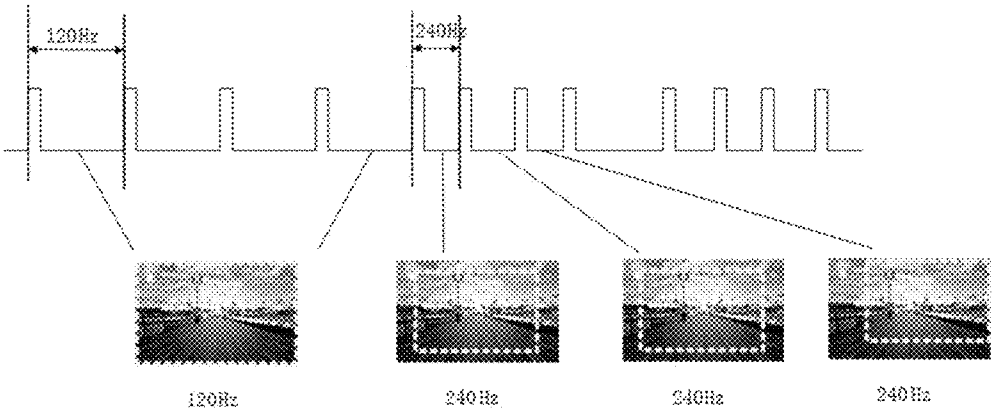
FIG. 6 is a schematic diagram illustrating another refresh timing of a display panel and a corresponding image displayed thereon, in a case where a local area refreshed at a second refresh rate moves.

With this determination result of step S4 and the method of performing step S6 according to this determination result, it can solve the problem of image tearing due to the image trail caused by the fact that the image refreshed at the second refresh rate in a previous frame enters into other areas (i.e. the areas refreshed at the first refresh rate) of the display panel and is retained when the local area refreshed at the second refresh rate moves, and ensure the normal display of the full-screen image of the display panel when the local area refreshed at the second refresh rate moves. FIG. 6 is a schematic diagram illustrating another refresh timing of a display panel and a corresponding image displayed thereon, in a case where a local area refreshed at a second refresh rate moves. Referring to FIG. 6, if the local area refreshed at 240 Hz moves (when the current local area refreshed at 240 Hz is required to be changed to a new local area), then the current local area refreshed at 240 Hz is refreshed at 240 Hz for another frame of image, and then it is the time for the new local area to be refreshed at 240 Hz.

According to the display method provided by the embodiment of the present disclosure, for one thing, high frequency local refresh can be realized in the display panel, thereby solving the problem that the resolution of full-screen display must be reduced when performing the high frequency refresh, realizing clearer and finer image display in the local area of the display panel, and improving display effect of the full-screen image of the display panel. For another thing, the display method can solve the problem that when the local area of the display panel is refreshed at the second refresh rate, the holding capacitor in other areas (i.e. areas refreshed at the first refresh rate) of the display panel cannot maintain the display data for a long time, which causes the black image in the area refreshed at the first refresh rate, so that the display data can be maintained well in the area refreshed at the first refresh rate, thereby ensuring normal display of a full-screen image of the display panel when the local area of the display panel is refreshed at the second refresh rate. For yet another thing, the display method can solve the problem of image tearing due to the image trail caused by the fact that the image refreshed at the second refresh rate in a previous frame enters into other areas (i.e. the areas refreshed at the first refresh rate) of the display panel and is retained when the local area refreshed at the second refresh rate moves, and ensure the normal display of the full-screen image of the display panel when the local area refreshed at the second refresh rate moves.

Figure 7:
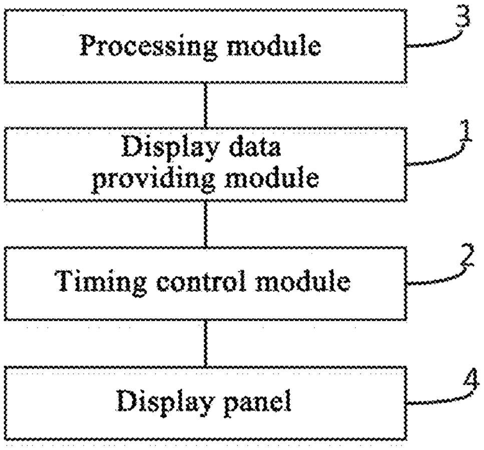
FIG. 7 is a schematic block diagram illustrating a display device provided by an embodiment of the present disclosure.

In a second aspect, based on the display method in the foregoing embodiments, an embodiment of the present disclosure further provides a display device that displays with the foregoing display method. FIG. 7 is a schematic block diagram illustrating a display device provided by an embodiment of the present disclosure. Referring to FIG. 7, this display device includes a display data providing module 1, a timing control module 2, a processing module 3 and a display panel 4. The processing module 3 is connected to the display data providing module 1; the display data providing module 1 is connected to the timing control module 2; and the timing control module 2 is connected to the display panel 4. The processing module 3 is configured to determine whether there is a local area of the display panel 4 to be refreshed at a second refresh rate, and control the display data providing module 1 to provide display data to the timing control module 2 according to the determination result. The processing module 3 is further configured to determine whether the local area refreshed at the second refresh rate needs to move and whether a refresh factor is greater than or equal to a set value, and control the display data providing module 1 to provide display data to the timing control module 2 according to the determination result. The processing module 3 is further configured to preset and update the refresh factor. The display data providing module 1 is configured to provide the display data with the first refresh rate to the timing control module 2, when the local area of the display panel 4 is not refreshed at the second refresh rate. The display data providing module 1 is further configured to provide the display data with the second refresh rate to the timing control module 2 to drive the local area of the display panel 4 to display, when the local area of the display panel 4 is refreshed at the second refresh rate. The display data providing module 1 is further configured to provide a frame of display data with the first refresh rate to the timing control module 2, when the local area refreshed at the second refresh rate does not need to move and the refresh factor is greater than or equal to the set value. The display data providing module 1 is further configured to provide display data with the second refresh rate to the timing control module 2 to drive the same local area in the display panel 4 to display, when the local area refreshed at the second refresh rate does not need to move and the refresh factor is less than the set value. The timing control module 2 is configured to control the display panel 4 to display, according to the display data provided by the display data providing module 1. The second refresh rate is greater than the first refresh rate, and the second refresh rate is an integer multiple of the first refresh rate.

According to the display device, by arranging the processing module 3 and the display data providing module 1, on one hand, high frequency local refresh can be realized in the display panel 4, thereby solving the problem that the resolution of full-screen display must be reduced when performing the high frequency refresh, realizing clearer and finer image display in the local area of the display panel 4, and improving display effect of the full-screen image of the display panel 4. On the other hand, it can solve the problem that when the local area of the display panel 4 is refreshed at the second refresh rate, the holding capacitor in other areas (i.e. areas refreshed at the first refresh rate) of the display panel 4 cannot maintain the display data for a long time, which causes the black image in the area refreshed at the first refresh rate, so that the display data can be maintained well in the area refreshed at the first refresh rate, thereby ensuring normal display of a full-screen image of the display panel when the local area of the display panel 4 is refreshed at the second refresh rate.

In some embodiments, the display data providing module 1 is further configured to provide a frame of display data with the first refresh rate to the timing control module 2, when the local area refreshed at the second refresh rate needs to move. With this functional configuration of the display data providing module 1, it can solve the problem of image tearing due to the image trail caused by the fact that the image refreshed at the second refresh rate in a previous frame enters into other areas (i.e. the areas refreshed at the first refresh rate) of the display panel 4 and is retained when the local area refreshed at the second refresh rate moves, and ensure the normal display of the full-screen image of the display panel 4 when the local area refreshed at the second refresh rate moves.

In some embodiments, the display data providing module 1 is further configured to provide a frame of display data with the second refresh rate to the timing control module 2, to drive the current local area of the display panel 4 to display, when the local area refreshed at the second refresh rate needs to move. The display data providing module 1 is further configured to provide a frame of display data with the first refresh rate to the timing control module 2, when the local area refreshed at the second refresh rate needs to move and the refresh factor is greater than or equal to the set value. The display data providing module 1 is further configured to provide the display data with the second refresh rate to the timing control module 2, to drive another local area of the display panel 4 to display, when the local area refreshed at the second refresh rate needs to move and the refresh factor is less than the set value. With this functional configuration of the display data providing module 1, it can solve the problem of image tearing due to the image trail caused by the fact that the image refreshed at the second refresh rate in a previous frame enters into other areas (i.e. the areas refreshed at the first refresh rate) of the display panel 4 and is retained when the local area refreshed at the second refresh rate moves, and ensure the normal display of the full-screen image of the display panel 4 when the local area refreshed at the second refresh rate moves.

In some embodiments, the processing module 3 adopts a central processing unit (e.g., CPU); the timing control module 2 adopts a timing controller (e.g., TCON); the display data providing module 1 is, for example, a GPU; and the display panel 4 includes a pixel array configured for displaying the display data. In addition, the display panel 4 further includes a plurality of pixel driving circuits, the plurality of pixel driving circuits are connected to the pixels in the pixel array in one-to-one correspondence, and the pixel driving circuits can independently drive the pixels, so that the pixel array realizes a divisional display (e.g., a partitioned-screen display) and a non-divisional display (e.g., a non-partitioned-screen display) of the display data.

According to the display device provided by the embodiment of the present disclosure, by arranging the processing module 3 and the display data providing module 1, for one thing, high frequency local refresh can be realized in the display panel 4, thereby solving the problem that the resolution of full-screen display must be reduced when performing the high frequency refresh, realizing clearer and finer image display in the local area of the display panel 4, and improving display effect of the full-screen image of the display panel 4. For another thing, it can solve the problem that when the local area of the display panel 4 is refreshed at the second refresh rate, the holding capacitor in other areas (i.e. areas refreshed at the first refresh rate) of the display panel 4 cannot maintain the display data for a long time, which causes the black image in the area refreshed at the first refresh rate, so that the display data can be maintained well in the area refreshed at the first refresh rate, thereby ensuring normal display of a full-screen image of the display panel when the local area of the display panel 4 is refreshed at the second refresh rate. For yet another thing, it can solve the problem of image tearing due to the image trail caused by the fact that the image refreshed at the second refresh rate in a previous frame enters into other areas (i.e. the areas refreshed at the first refresh rate) of the display panel 4 and is retained when the local area refreshed at the second refresh rate moves, and ensure the normal display of the full-screen image of the display panel 4 when the local area refreshed at the second refresh rate moves.

The display device may be any product or component with a VR (Virtual Reality) display function, such as an OLED panel, an OLED television, a mobile phone, a tablet computer, a notebook computer, a monitor, a digital photo frame, and a navigator.

In a third aspect, an embodiment of the present disclosure further provides a computer readable medium storing a computer program which, when executed by a processor, cause a processor to perform the display method in the foregoing embodiments.

The computer readable medium can also realize the advantageous effects obtained by the above display method.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and essence of the present disclosure, and such modifications and improvements are also considered to be within the scope of the present disclosure.

What is claimed is:

1. A display method, comprising:

performing a full-screen display refresh on a display panel at a first refresh rate; meanwhile, setting a refresh factor to n, where n is a positive integer;

determining whether there is a local area of the display panel to be refreshed at a second refresh rate;

if there is no local area of the display panel to be refreshed at the second refresh rate, continuing performing the full-screen display refresh on the display panel at the first refresh rate;

if there is a local area of the display panel to be refreshed at the second refresh rate, refreshing the local area of the display panel at the second refresh rate; meanwhile, increasing the refresh factor by m, where m is a positive integer;

determining whether the local area refreshed at the second refresh rate needs to move;

if the local area refreshed at the second refresh rate does not need to move, determining whether the refresh factor is greater than or equal to a set value;

if the refresh factor is greater than or equal to the set value, performing the full-screen display refresh on the display panel at the first refresh rate; meanwhile, setting the refresh factor to n; and if the refresh factor is less than the set value, continuing refreshing the same local area of the display panel at the second refresh rate; meanwhile, increasing the refresh factor by m, wherein the second refresh rate is greater than the first refresh rate, and the second refresh rate is an integer multiple of the first refresh rate.

2. The display method according to claim 1, wherein subsequent to determining whether the local area refreshed at the second refresh rate needs to move, If the local area refreshed at the second refresh rate needs to move, performing the full-screen display refresh on the display panel at the first refresh rate for one frame; meanwhile, setting the refresh factor to n.

3. The display method according to claim 1, wherein subsequent to determining whether the local area refreshed at the second refresh rate needs to move, if the local area refreshed at the second refresh rate needs to move, refreshing, at the second refresh rate, the local area currently refreshed at the second refresh rate for one frame; meanwhile, increasing the refresh factor by m;

then determining whether the refresh factor is greater than or equal to the set value;

if the refresh factor is greater than or equal to the set value, refreshing the display panel at the first refresh rate for one frame; meanwhile, setting the refresh factor to n;

if the refresh factor is less than the set value, refreshing another local area of the display panel at the second refresh rate; meanwhile, increasing the refresh factor by m.

4. The display method according to claim 3, wherein when the local area currently refreshed at the second refresh rate is refreshed at the second refresh rate for one frame, images in other areas of the display panel are retained; and when the another local area of the display panel is refreshed at the second refresh rate, images in other areas of the display panel are retained.

5. The display method according to claim 1, wherein when the local area of the display panel is refreshed at the second refresh rate, images in other areas of the display panel are retained; and when the refresh factor is less than the set value, the same local area of the display panel continues being refreshed at the second refresh rate, and images in other areas of the display panel are retained.

6. The display method according to claim 1, wherein the refresh factor is a ratio of times number of refresh at the second refresh rate to times number of refresh with the first refresh rate for a time period; and the refresh factor is in a range of 2 to 6; and the refresh factor is an integer.

7. The display method according to claim 6, wherein the set value is in a range of 3 to 6, and the set value is an integer.

8. The display method according to claim 7, wherein the set value is 3.

9. The display method according to claim 1, wherein the second refresh rate is 2 to 6 times the first refresh rate.

10. The display method according to claim 9, wherein the first refresh rate is 120 Hz, and the second refresh rate is 240 Hz; or the first refresh rate is 120 Hz, and the second refresh rate is 360 Hz.

11. A non-transitory computer readable medium storing a computer program which, when executed by a processor, cause the processor to perform the display method according to claim 1.

12. A display device, comprising the non-transitory computer readable medium according to claim 11.

13. A display device, comprising a display data providing module, a timing control module, a processing module, and a display panel;

wherein the processing module is connected to the display data providing module; the display data providing module is connected to the timing control module; and the timing control module is connected to the display panel;

the processing module is configured to determine whether there is a local area of the display panel to be refreshed at a second refresh rate, and control the display data providing module to provide display data to the timing control module according to a determination result; the processing module is further configured to determine whether the local area refreshed at the second refresh rate needs to move and whether a refresh factor is greater than or equal to a set value, and control the display data providing module to provide display data to the timing control module according to a determination result; and the processing module is further configured to preset and update the refresh factor;

the display data providing module is configured to provide display data with the first refresh rate to the timing control module, when there is no local area of the display panel to be refreshed at the second refresh rate; the display data providing module is further configured to provide, when there is a local area of the display panel to be refreshed at the second refresh rate, display data with the second refresh rate to the timing control module, to drive the local area of the display panel to display; the display data providing module is further configured to provide a frame of display data with the first refresh rate to the timing control module, when the local area refreshed at the second refresh rate does not need to move and the refresh factor is greater than or equal to the set value; and the display data providing module is further configured to provide, when the local area refreshed at the second refresh rate does not need to move and the refresh factor is less than the set value, display data with the second refresh rate to the timing control module, to drive the same local area in the display panel to display;

the timing control module is configured to control the display panel to display, according to the display data provided by the display data providing module; and the second refresh rate is greater than the first refresh rate, and the second refresh rate is an integer multiple of the first refresh rate.

14. The display device according to claim 13, wherein the display data providing module is further configured to provide a frame of display data with the first refresh rate to the timing control module, when the local area refreshed at the second refresh rate needs to move.

15. The display device according to claim 13, wherein the display data providing module is further configured to provide a frame of display data with the second refresh rate to the timing control module, to drive a current local area of the display panel to display, when the local area refreshed at the second refresh rate needs to move;

the display data providing module is further configured to provide a frame of display data with the first refresh rate to the timing control module, when the local area refreshed at the second refresh rate needs to move and the refresh factor is greater than or equal to the set value; and the display data providing module is further configured to provide the display data with the second refresh rate to the timing control module, to drive another local area of the display panel to display, when the local area refreshed at the second refresh rate needs to move and the refresh factor is less than the set value.

16. The display device according to claim 13, wherein the processing module adopts a central processing unit; the timing control module adopts a timing controller; and the display panel comprises a pixel array configured for displaying the display data.

* * * * *